United States Patent [19]
Seigler

[11] Patent Number: 5,957,541
[45] Date of Patent: Sep. 28, 1999

[54] ILLUMINATED SKATE WHEEL

[75] Inventor: Kenneth Seigler, Wanamassa, N.J.

[73] Assignee: Kenle International, Inc., Wanamassa, N.J.

[21] Appl. No.: 08/892,440

[22] Filed: Jul. 14, 1997

[51] Int. Cl.[6] .................................................. B60Q 1/26
[52] U.S. Cl. ............................................... 301/5.3; 362/78
[58] Field of Search ........................... 301/5.3, 5.7, 64.7; 280/11.19, 11.22, 11.23; 362/78, 103

[56] References Cited

U.S. PATENT DOCUMENTS

| | | | |
|---|---|---|---|
| 4,214,683 | 7/1980 | Wills et al. . | |
| 4,298,910 | 11/1981 | Price . | |
| 4,363,502 | 12/1982 | Bakerman . | |
| 4,648,610 | 3/1987 | Hegyi . | |
| 4,702,527 | 10/1987 | Kawano | 301/64.7 X |
| 5,278,733 | 1/1994 | St. Thomas . | |
| 5,475,572 | 12/1995 | Tseng | 301/5.7 X |
| 5,552,972 | 9/1996 | Rezvani . | |
| 5,580,092 | 12/1996 | Hsu et al. | 362/78 X |
| 5,683,164 | 11/1997 | Chien | 362/78 |
| 5,730,520 | 3/1998 | Hsu et al. | 362/78 |

*Primary Examiner*—Russell D. Stormer
*Attorney, Agent, or Firm*—Clifford G. Frayne

[57] ABSTRACT

An illuminating device cooperative with an in-line skate or roller skate wheel the illuminating device having a power source, a centrifugal switch and a light emitting diode or similar illuminating device, the light emitting diode or illuminating device positioned within a radial bore of the wheel, and the power source and centrifugal switch mounted on an annular ring which is snap fit into the wheel of the in-line skate wheel or roller skate wheel.

5 Claims, 2 Drawing Sheets

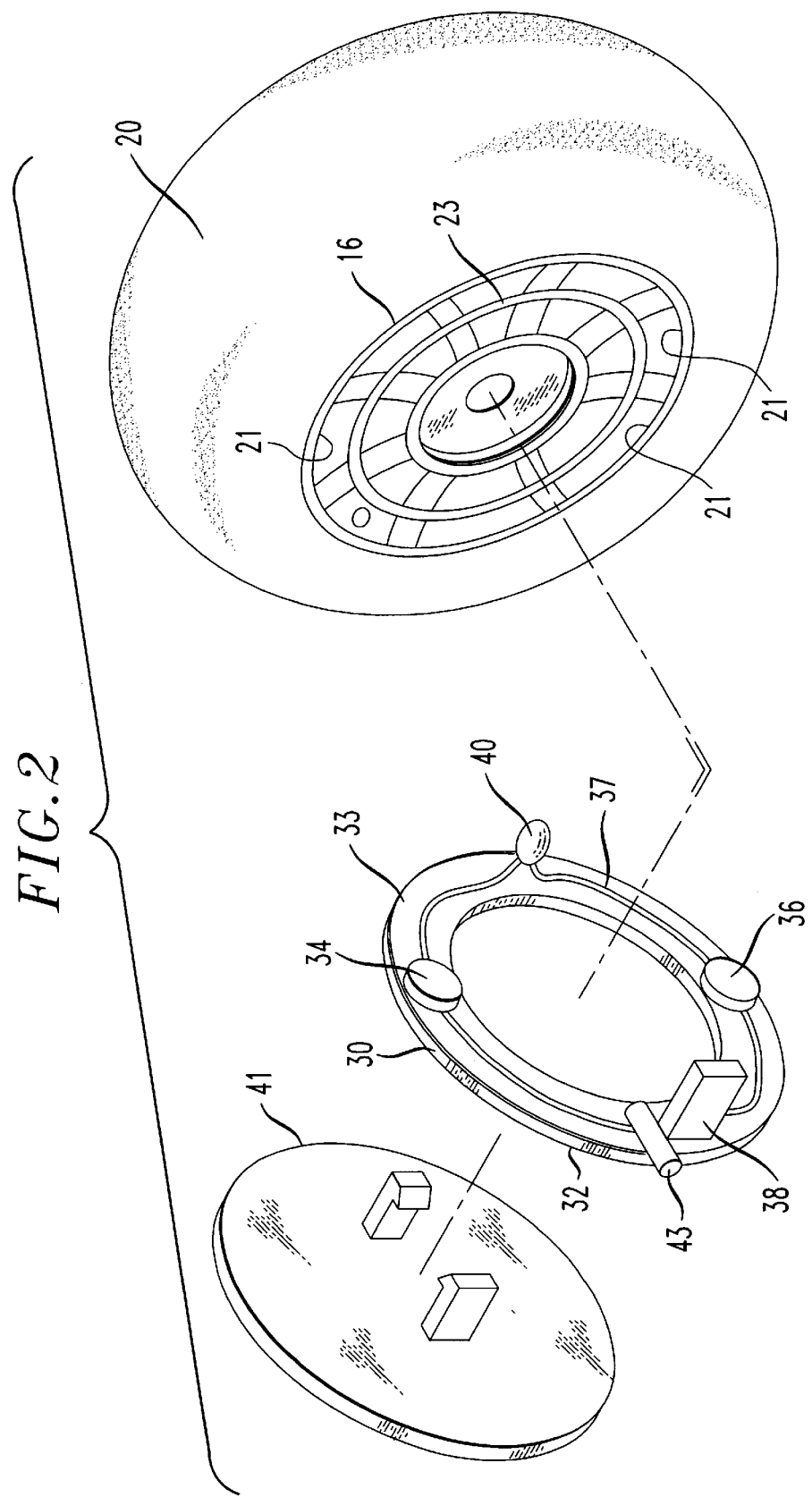

ILLUMINATED SKATE WHEEL

BACKGROUND OF THE INVENTION

1. Field of the Invention

This invention relates to rotatable wheels that display light during rotation and are provided with a power source for illuminating the wheel during use. The wheels in question are intended to be wheels on roller skates, in-line skates, or skateboards and each wheel would contain an electrical power source and a light emitting or illuminating member which enables the wheel to provide self-illumination when rotated.

2. Description of the Prior Art

It is known to provide lighting for skate wheels such that they will illuminate when in use and when rotated. Applicant is aware of various illuminating attempts as disclosed in U.S. Pat. No. 4,214,683 to Wills; U.S. Pat. No. 4,298,910 to Price; U.S. Pat. No. 4,363,502 to Bakerman; U.S. Pat. No. 4,648,610 to Hegyi; U.S. Pat. No. 5,278,733 to St. Thomas and U.S. Pat. No. 5,552,972 to Rezvani. All of the aforesaid patents disclose a method or apparatus for illuminating a skate wheel. Applicant's invention provides a much simpler, lighter and more economical manner in which the skate wheel can be illuminated and can be included as original equipment or an after market item for fitting on to the skate wheel. The aforesaid patents are provided with an information disclosure statement to be filed subsequent hereto.

OBJECT OF THE INVENTION

It is an object of the present invention to provide for a novel wheel which is capable of illumination during rotation.

It is still another object of the present invention to provide for a wheel which is self-powered such that it carries both the illuminating member and the power source on the wheel structure.

It is another object of the present invention to provide a wheel which generates its own power during use supplying electrical current to the illuminating member.

It is a further object of the present invention to provide a wheel which may be used as a support with a frame configured to support a person and which wheel displays lighting as the wheel rolls on the ground.

It is still a further object of the present invention to provide for a novel illuminating device which can be fit to existing wheels such as to provide illumination to the wheel when rotated and provide a self-contained power source.

It is a further object of the present invention to provide for a novel apparatus having a self-contained power source and illuminating member which can be attached to a wheel and illuminate the wheel upon rotation.

It is still a further object of the present invention to provide for a novel apparatus having a self-contained power source and illuminating member which can be secured to a wheel and illuminate the wheel during rotation wherein the apparatus contains a manual on/off switch.

SUMMARY OF THE INVENTION

These and other objects of the present invention are met by the self-powered lighted wheel of the present invention which comprises an annular ring or plate which is snap fit into the wheel having a power source balanced on the annular ring in approximately 180 degree relationship to each other to maintain the balance of the wheel, the ring further having a centrifugal switch which is also snap fit within the wheel and is balanced by an illuminating device such as a light emitting diode positioned opposite from the centrifugal switch to further maintain the balance of the wheel, the light emitting diode or illuminating device being affixed into the translucent body of the wheel, the power source, illuminating source and centrifugal switch being electrically connected such that the rotation of the wheel causes the centrifugal switch to close the circuit thereby providing power to the illuminating source or light emitting diode and the cessation of rotation of the wheel opens the circuit and ceases the flow of electricity to the illuminating member or light emitting diode.

BRIEF DESCRIPTION OF THE DRAWINGS

The objects of the invention and other features will be appreciated particularly with reference to the following drawings and written specification which follow.

FIG. 2 is prospective view of Applicant's illuminating apparatus.

DETAILED DESCRIPTION OF THE DRAWINGS

Figure 1:
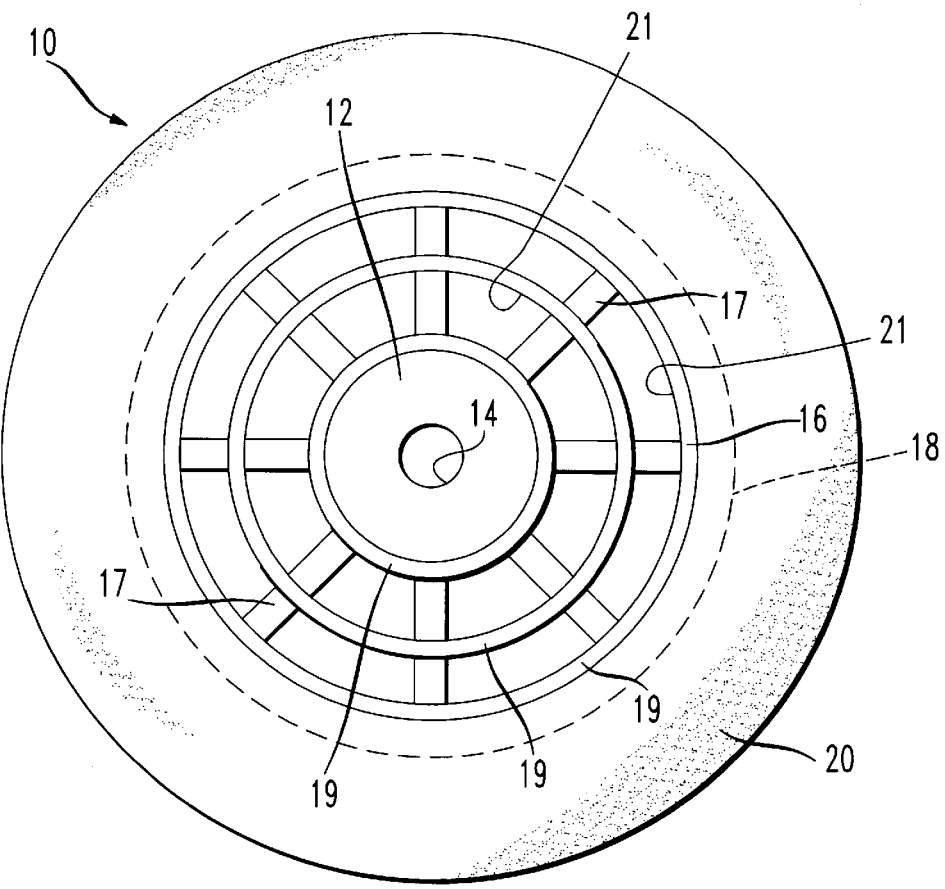
FIG. 1 is a side view of a typical in-line skate wheel identifying the major characteristics of same.

FIG. 1 is a side view of a typical roller skate or in-line skate wheel assembly 10. Typically, the wheel assembly 10 comprises a hub 12 having an aperture 14 therethrough for slidably positioning the wheel assembly 10 onto an axle of the skate. Typically, since hub 12 is in contact with the fixed axle of the skate, the hub member would preferably be constructed of light weight metal, but could also be constructed of a durable plastic. Hub 12 is essentially secured in wheel member 16. In the interest of maintaining the light weight factor as respects the wheel assembly 10 of a skate, the wheel member 16 is normally made of a plastic or a similar light weight material and it is designed in a honeycomb fashion to reduce the weight having a plurality of radial spokes 17 and concentric braces 19 forming voids 21. Wheel member 16 has an outer circumferential portion 18 which is actually encapsulated by tire 20 which is typically, molded urethane. Tire 20 can be opaque, but in most instances, it is transparent or translucent. Applicant's invention is adapted to cooperate with the honeycomb or spoke like portion 17 and 19 of wheel member 16, which is not encapsulated by tire 20. This portion 23 of the wheel 16 is normally annularly concave about hub 12.

FIG. 2 is a perspective view of Applicant's illuminating apparatus. Applicant's illuminating apparatus comprises a circumferential mounting element and more particularly a ring member 30 having a first outer annular planar surface 32 and a second inner annular planar surface 33. The circumference of ring member 30 is designed to be coextensive with the unencapsulated portion of wheel member 16.

Positioned on inner annular planar surface 33 of ring member 30 are two battery receptacles 34 and 36. Battery receptacles 34 and 36 are positioned on ring member 30 preferably in 180 degree relationship with each other in order to balance the illuminating apparatus and to simultaneously maintain the balance of the wheel when affixed to the wheel. Each of battery receptacles 34 and 36 is sized to accommodate a low voltage battery such as a 1.5V or a 3 volt lithium battery or equivalent. The battery receptacles 34 and 36 are generally perpendicular to inner annular planar surface 33 of ring member 30 such that when ring member 30 is inserted into the wheel 16, the battery receptacles 34 and 36 occupy voids 21 in wheel member 16 as a result of wheel member 16's honeycomb or spoke-like construction.

Also positioned on inner annular planar surface 33 of ring member 30 is a centrifugal switch 38 which is also generally perpendicularly positioned with respect to inner annular planar surface 33. Centrifugal switch 38 is also designed to occupy a void 21 in wheel member 16 as a result of wheel member 16's honeycomb or spoke-like construction. The centrifugal switch 38 operates in the fashion where when the skate wheel assembly 10 is in a stationary mode, the centrifugal switch is open and no power is drawn from the batteries. The rotation of the wheel assembly 10 closes centrifugal switch 38 thus completing a circuit as more fully described hereafter, and sending power to the light emitting diode or other illuminating device.

The final element on ring member 30, is the illuminating device or light emitting diode 40 which is positioned on ring member 30 opposite the centrifugal switch 38, again for balance of the wheel and which is embedded through the wheel member and into the tire member. A light emitting diode or illuminating device 40 is in electrical communication with the power source and battery receptacles 34 and 36 and the centrifugal switch 38 by means of wires 37 affixed to the inner annular planar surface of ring member inner annular planar surface 33 of ring member 30.

In this configuration, the light emitting diode or illuminating device 40 would be inserted into a receptacle formed in the outer circumference of wheel member 16 and extending into the molded urethane tire. Ring member 30 would then be inserted into the wheel well 17 positioning battery receptacles 34 and 36 and their power sources and the centrifugal switch 38 into the voids formed by the honeycomb or spoke-like construction of the wheel. Ring member 30 can be further protected and held in place by means of circumferential plug 41 which would snap fit over ring member 30.

Additionally, the centrifugal switch 38 could be fitted with a manual override 43 which would allow the user to manually place the illuminating apparatus in a permanently off position in order to preserve battery life in those instances where an illuminated skate wheel would not serve a safety purpose such as when one was skating in daylight or indoors in a lighted rink.

Figure 3:
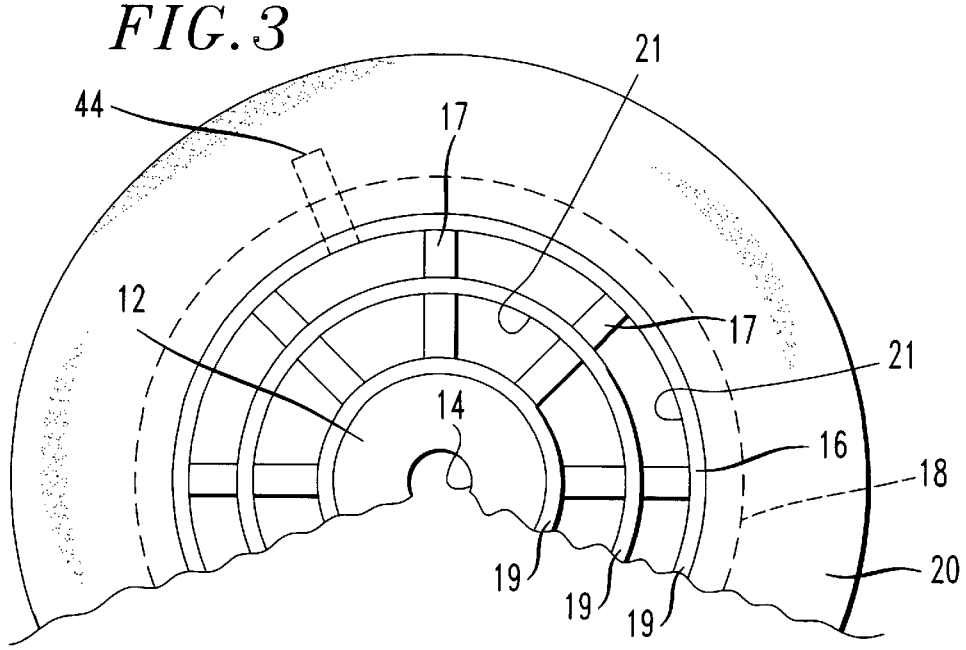
FIG. 3 is a partial enlarged view of FIG. 1 showing the manner in which the illuminating apparatus is fit into the wheel.

FIG. 3 is a partial enlarged view of FIG. 1 illustrating the manner in which the illuminating device 40 is positioned within the wheel 16. As illustrated, a bore 44 is formed through the outer circumference of wheel 16 and extends into tire 20 terminating within tire 20 at a point beyond the encapsulated portion 18 of wheel 16. This bore is dimensioned to receive the illuminating device or light emitting diode and is dimensioned accordingly. This bore may be formed during the construction and manufacture of the wheel and tire 16 and 20 or could be formed by the user for after market installation. The illuminating device or light emitting diode 40 would be inserted into bore 44 and then ring member 30 would be positioned in the annularly concave portion 23 of wheel 16 and battery receptacles 34 and 36 with their energizing device energizing batteries positioned therein and centrifugal switch 38 would snap fit into respective voids 21 in wheel 16 thereby maintaining the illuminating device in position and positioning the illuminating device such that it does not extend outwardly beyond the normal planar sidewall of the wheel. Optionally, a circumferential plug 50 can be snap fit over ring member 30 to protect ring member 30 and to further insure its placement.

In this configuration, the user can easily unsnap ring member 30 from its snap fit positioning on wheel 16 to replace the batteries in battery receptacles 34 and 36 when necessary. Additionally, the user can also engage the manual override 43 to place the illuminating apparatus in a permanently off position if so desired.

While the present invention has been described with respect to the exemplary embodiments thereof, it will be recognized by those of ordinary skill in the art that many modifications will be apparent and this application is intended to cover any adaptation or variations thereof. Therefore, it is manifestly intended that this invention be only limited by the claims and equivalence thereof.

I claim:

1. A self-illuminating wheel rotatable about an axis of rotation comprising:

a wheel for mounting on and rotation about an axle, said wheel being of honeycombed construction having a plurality of spokes and a plurality of concentric inner supports thereby defining voids in said wheel;

a translucent traction tire mounted on said wheel, said traction tire encapsulating the outer circumference of said wheel;

a ring member removably secured to said wheel, said ring member dimensioned to that portion of said wheel that is not encapsulated;

a plurality of battery mounts positioned on said ring member for receipt in mounting of a plurality of power sources, said battery mounts and said power sources positioned on said ring member in 180 degree relationship;

a centrifugal switch and manual override mounted on said ring member, said centrifugal switch open when said wheel is stationery and closed when said wheel is rotated;

an illuminating means positioned through said outer circumference of said wheel and into said translucent traction tire, said illuminating means in electrical communication with said power source and said centrifugal/manual switch, such that said illuminating means is illuminated when said wheel is rotated;

said battery mounts and said centrifugal switch and said manual override positioned within said voids of said wheel being of said honeycombed construction.

2. A self-illuminating wheel in accordance with claim 1, wherein said plurality of battery mounts comprises two battery mounts positioned approximately 180 degrees apart on said circumferential mounting element.

3. A self-illuminating wheel in accordance with claim 1, wherein said centrifugal switch and said manual override and said illuminating means are positioned on said circumferential mounting element in approximately 180 degree relationship to each other.

4. A self-illuminating wheel in accordance with claim 1, wherein said illuminating means comprises one or more light emitting diodes.

5. A self-illuminating wheel in accordance with claim 1, wherein said ring member is maintained in position on said wheel by means of a circumferential plug which snap fits over said circumferential mounting element.

* * * * *